(12) United States Patent
Slaton

(10) Patent No.: US 9,728,170 B2
(45) Date of Patent: Aug. 8, 2017

(54) MOUNTING SYSTEM FOR PIVOTAL COUPLING OF A TUNER TO AN INSTRUMENT

(71) Applicant: Guitar Center, Inc., Westlake Village, CA (US)

(72) Inventor: Robin Richard Slaton, Fort Collins, CO (US)

(73) Assignee: Guitar Center, Inc., Westlake Village, CA (US)

( * ) Notice: Subject to any disclaimer, the term of this patent is extended or adjusted under 35 U.S.C. 154(b) by 0 days.

(21) Appl. No.: 15/224,209

(22) Filed: Jul. 29, 2016

(65) Prior Publication Data

US 2017/0132994 A1    May 11, 2017

Related U.S. Application Data

(63) Continuation of application No. 29/545,153, filed on Nov. 10, 2015.

(51) Int. Cl.
| | | |
|---|---|---|
| *G10G 7/02* | (2006.01) | |
| *G10G 7/00* | (2006.01) | |
| *F16C 11/06* | (2006.01) | |
| *F16M 13/02* | (2006.01) | |
| *F16B 2/10* | (2006.01) | |

(52) U.S. Cl.
CPC ............... *G10G 7/00* (2013.01); *F16B 2/10* (2013.01); *F16C 11/06* (2013.01); *F16C 11/0695* (2013.01); *F16M 13/022* (2013.01); *G10G 7/02* (2013.01)

(58) Field of Classification Search
CPC ...................................................... G10G 7/02

USPC .................................................. 84/453–455
See application file for complete search history.

(56) References Cited

U.S. PATENT DOCUMENTS

| 892,105 | A | * | 6/1908 | White | F16L 3/202 |
| --- | --- | --- | --- | --- | --- |
| | | | | | 122/510 |
| 2,650,788 | A | * | 9/1953 | Hulstein | F16M 13/02 |
| | | | | | 248/231.71 |
| 3,059,948 | A | * | 10/1962 | Thompson | F16C 11/106 |
| | | | | | 384/170 |
| 3,576,149 | A | * | 4/1971 | Slingerland, Jr. | F16M 11/14 |
| | | | | | 84/421 |
| 5,388,496 | A | | 2/1995 | Miller et al. | |
| 5,804,747 | A | * | 9/1998 | Chen | F16M 11/14 |
| | | | | | 248/443 |
| 5,845,885 | A | * | 12/1998 | Carnevali | F16M 11/14 |
| | | | | | 248/181.1 |
| 5,895,874 | A | * | 4/1999 | Liao | G10D 13/00 |
| | | | | | 84/327 |

(Continued)

OTHER PUBLICATIONS

Design U.S. Appl. No. 29/545,153, filed Nov. 10, 2015.

*Primary Examiner* — David Warren
(74) *Attorney, Agent, or Firm* — Craig R. Miles; CR Miles P.C.

(57) ABSTRACT

Disclosed herein are embodiments of a mounting system for pivotal coupling to an instrument, the mounting system including a tuner, a ball element outwardly extending from the tuner, and a socket element having a wall defining a socket in communication with a wall opening; whereby the socket is configured to pivotally receive at least a portion of the ball element via the wall opening to pivotally couple the ball element to the socket element.

16 Claims, 12 Drawing Sheets

(56) References Cited

U.S. PATENT DOCUMENTS

| | | | | |
|---|---|---|---|---|
| 5,973,248 A * | 10/1999 | Chen | ............... | G10D 13/026 248/441.1 |
| 6,242,677 B1 * | 6/2001 | Sander | ............... | G10D 3/163 84/319 |
| 6,653,543 B2 | 11/2003 | Kulas | | |
| 6,965,067 B2 | 11/2005 | Kondo | | |
| 7,265,282 B2 * | 9/2007 | Membreno | ............... | G10G 7/02 84/453 |
| 7,390,951 B2 * | 6/2008 | Dulaney | ............... | G10G 7/02 84/454 |
| 7,531,732 B2 * | 5/2009 | Dunlop | ............... | G10G 7/00 248/443 |
| 7,663,043 B2 | 2/2010 | Park | | |
| 7,723,595 B2 * | 5/2010 | Dunlop | ............... | G10G 7/00 248/443 |
| D661,342 S * | 6/2012 | Ridinger | ............... | D17/99 |
| 8,487,169 B2 * | 7/2013 | Dunlop | ............... | F16M 11/041 248/443 |
| 8,800,942 B2 * | 8/2014 | Yu | ............... | F16M 11/14 248/122.1 |
| 9,240,170 B2 * | 1/2016 | Chekardzhikov | ............... | G10G 7/02 |
| 2006/0011795 A1 * | 1/2006 | Dobbins | ............... | B60R 11/00 248/276.1 |
| 2008/0061197 A1 * | 3/2008 | Carnevali | ............... | F16M 11/14 248/181.1 |
| 2008/0092717 A1 * | 4/2008 | Dunlop | ............... | G10G 7/00 84/329 |
| 2008/0190265 A1 * | 8/2008 | Dunlop | ............... | G10G 7/00 84/421 |
| 2008/0296454 A1 * | 12/2008 | Carnevali | ............... | A47B 21/0314 248/231.71 |
| 2009/0000457 A1 * | 1/2009 | Dunlop | ............... | G10G 7/00 84/329 |
| 2011/0283863 A1 * | 11/2011 | Dunlop | ............... | F16M 11/041 84/329 |
| 2012/0266735 A1 * | 10/2012 | Dunlop | ............... | F16M 11/041 84/329 |
| 2015/0348523 A1 * | 12/2015 | Bisnauth | ............... | G09B 15/023 84/483.1 |

* cited by examiner

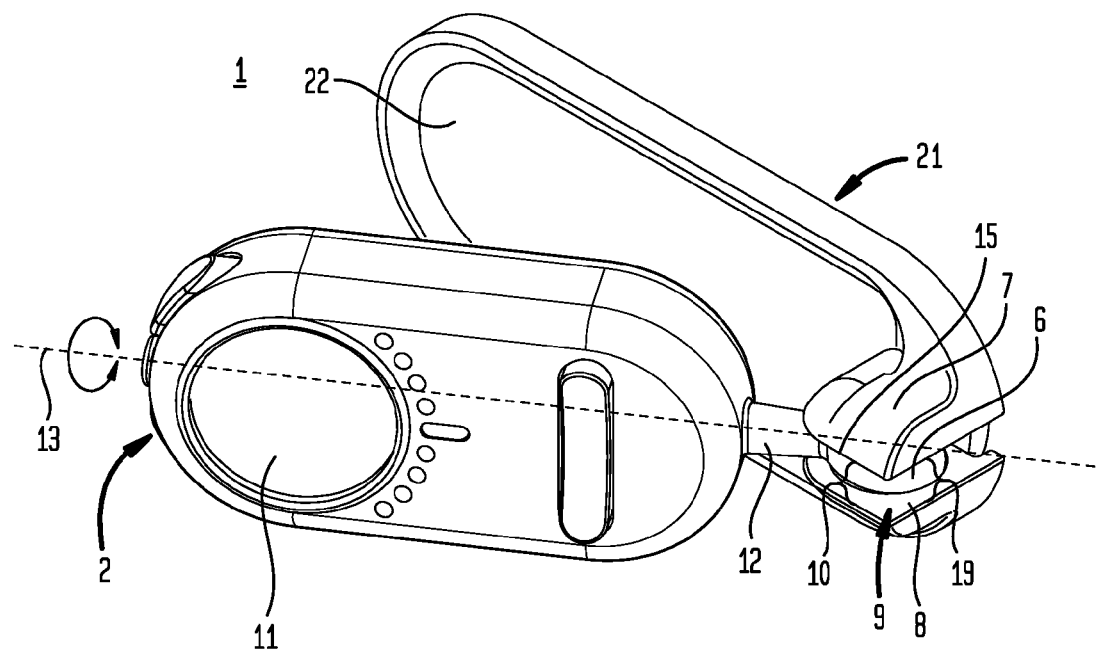
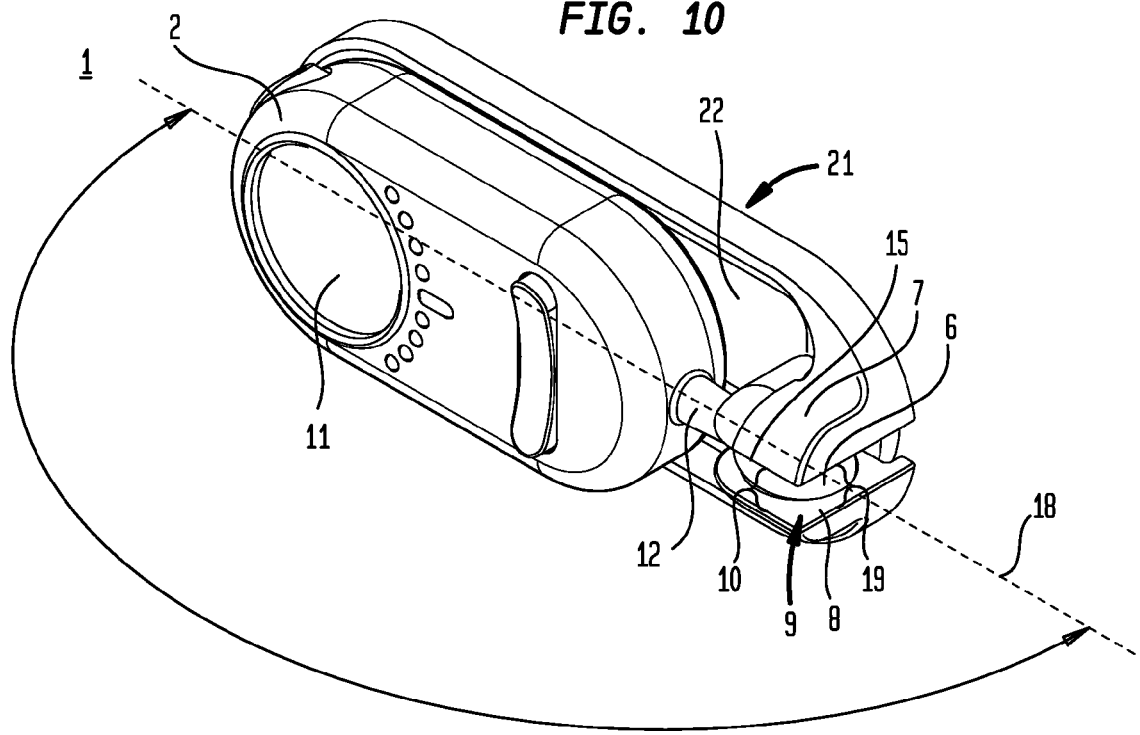

1/16

MOUNTING SYSTEM FOR PIVOTAL COUPLING OF A TUNER TO AN INSTRUMENT

This United States Non-Provisional Patent Application claims the benefit of U.S. Design patent application Ser. No. 29/545,153 filed Nov. 10, 2015, hereby incorporated by reference herein.

I. SUMMARY OF THE INVENTION

A broad object of a particular embodiment of the invention can be to provide a mounting system for pivotal coupling to an instrument, the mounting system including a tuner, a ball element outwardly extending from the tuner, and a socket element having a wall defining a socket in communication with a wall opening; whereby the socket is configured to pivotally receive at least a portion of the ball element via the wall opening to pivotally couple the ball element to the socket element.

Naturally, further objects of the invention are disclosed throughout other areas of the specification, drawings, and claims.

II. A BRIEF DESCRIPTION OF THE DRAWINGS

FIG. 9 is a front and right side perspective view of a particular embodiment of the mounting system comprising a tuner pivotally coupled to a mount.

FIG. 10 is a front and right side perspective view of a particular embodiment of the mounting system comprising a tuner pivotally coupled to a mount.

III. DETAILED DESCRIPTION OF THE PREFERRED EMBODIMENTS

Figure 1:
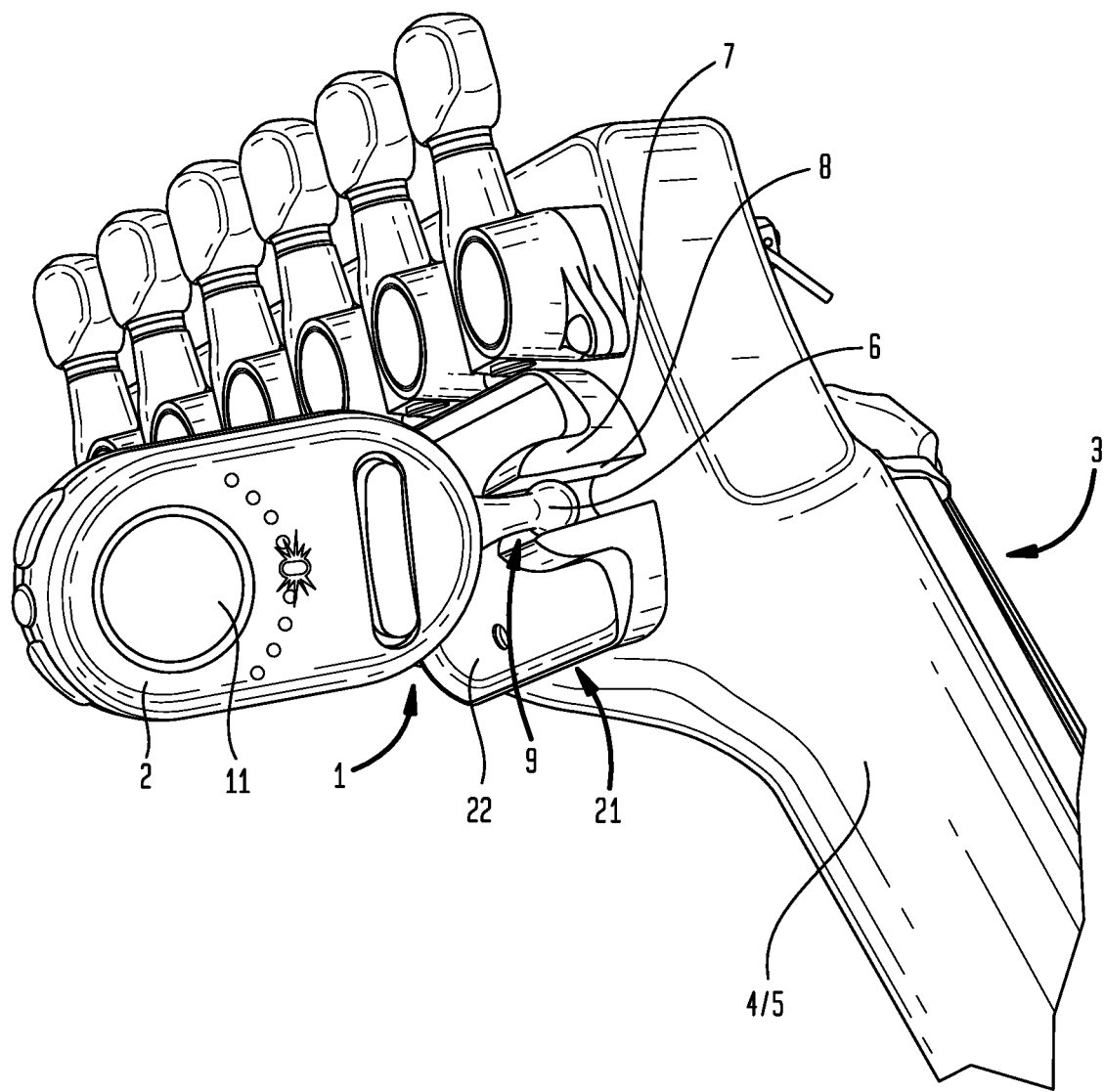
FIG. 1 is an illustration of a method of using a particular embodiment of the mounting system to pivotally couple a tuner to a headstock of a guitar.
Figure 2:
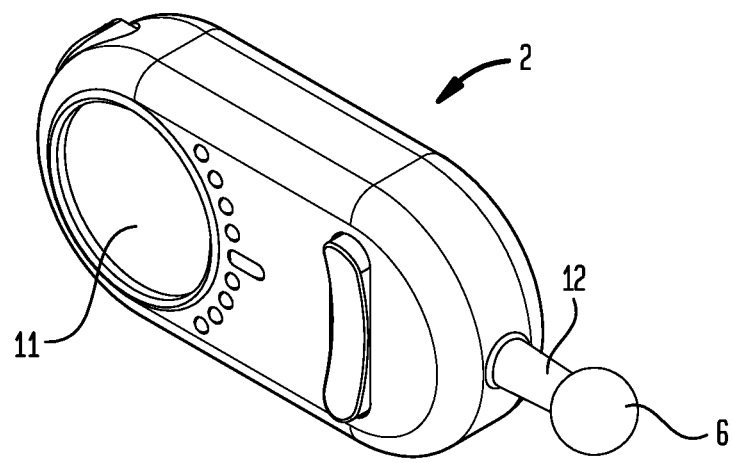
FIG. 2 is a front and right side perspective view of a particular embodiment of a tuner and ball element of the mounting system.
Figure 3:
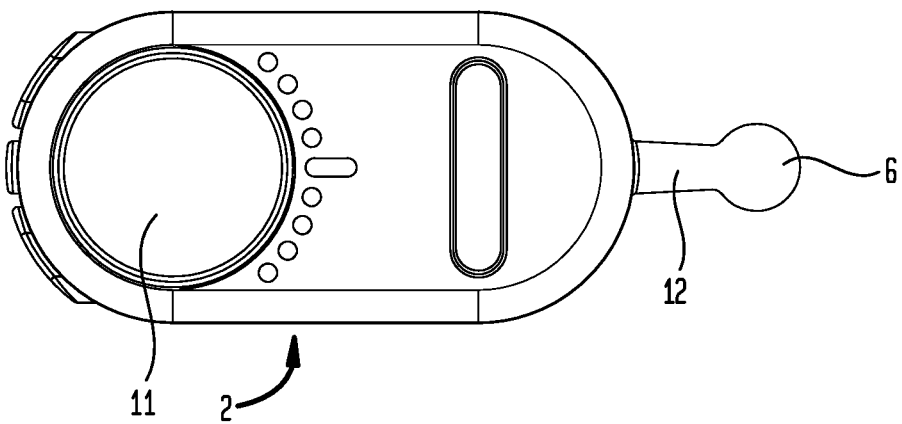
FIG. 3 is a front view of the tuner and ball element shown in FIG. 2.
Figure 4:
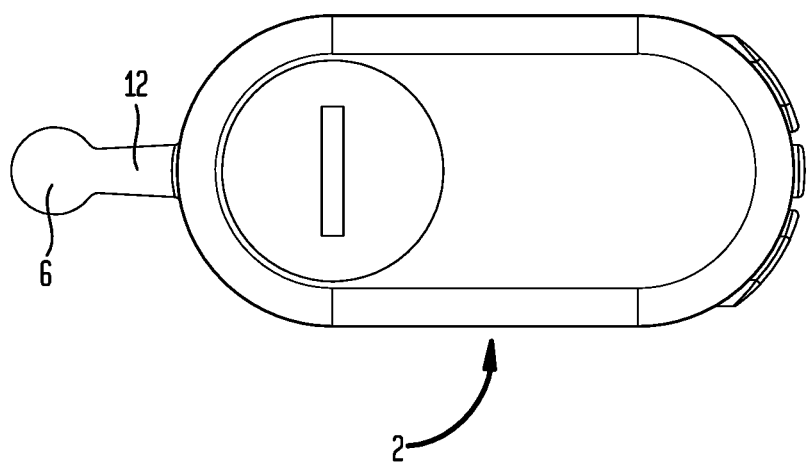
FIG. 4 is a rear view of the tuner and ball element shown in FIG. 2.
Figure 5:
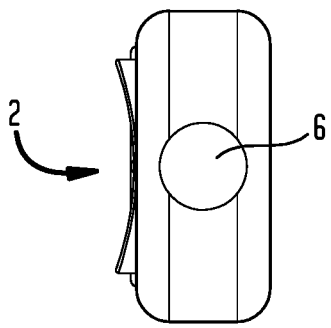
FIG. 5 is a first end view of the tuner and ball element shown in FIG. 2.
Figure 6:
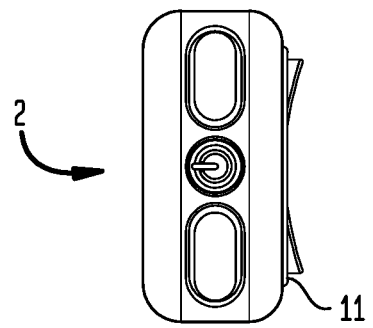
FIG. 6 is a second end view of the tuner and ball element shown in FIG. 2.
Figure 7:
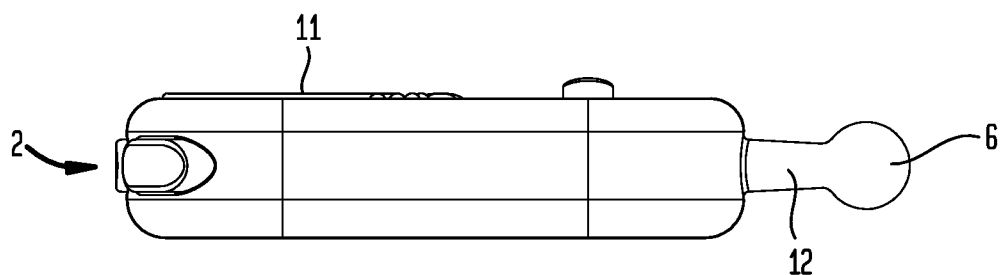
FIG. 7 is a first side view of the tuner and ball element shown in FIG. 2.
Figure 8:
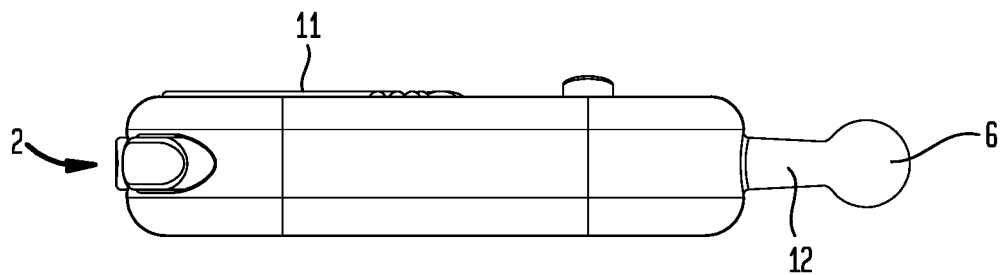
FIG. 8 is a second side view of the tuner and ball element shown in FIG. 2.

Now referring primarily to FIG. 1, which illustrates a method of using a particular embodiment of a mounting system (1) to pivotally couple a tuner (2) to an instrument (3), for example to couple a tuner (2) to a headstock (4) of a guitar (5), whereby the mounting system (1) includes a tuner (2), a ball element (6) outwardly extending from the tuner (2), and a socket element (7) having a wall (8) defining a socket (9) in communication with a wall opening (10), whereby the socket (9) is configured to pivotally receive at least a portion of the ball element (6) via the wall opening (10) to pivotally couple the ball element (6) and correspondingly, the tuner (2), to the socket element (7).

Again referring primarily to FIG. 1, the method of using the mounting system (1) includes obtaining the above-described mounting system (1) having the ball element (6) pivotally received within the socket (9), and mounting the socket element (7) to an instrument (3). As to particular embodiments, the method can further include pivoting the ball element (6) within the socket (9) to dispose the tuner (2) in a desired position, thereby allowing a user to use the tuner (2) to tune the instrument (3).

For the purposes of the present invention, the term "pivot" means the action of turning around on a point.

For the purposes of the present invention, "to pivotally couple" means to attach two bodies such that the bodies can change positions relative to one another around or about at least one point.

Now referring primarily to FIG. 2 through FIG. 25, the mounting system (1) includes a tuner (2) which can have any of a numerous and wide variety of configurations with any of a numerous and wide variety of features typical of tuners (2), as would be known to one of ordinary skill in the art, whereby the tuner (2) may be useful for tuning an instrument (3).

As non-limiting examples, the tuner (2) can, but need not necessarily, include features such as: auto-on/auto-off, illuminating display screen (11), visual metronome, wide calibration range, battery strength indicator, or the like.

Now referring primarily to FIG. 2 through FIG. 8, the mounting system (1) further includes a ball element (6) outwardly extending from the tuner (2), whereby the ball element (6) has a generally spherical shape.

As to particular embodiments, the ball element (6) can be coupled, directly coupled, or connected to the tuner (2), depending upon the application.

As to particular embodiments, the ball element (6) can be integrated with the tuner (2) such that the ball element (6) and the tuner (2) are formed as a one-piece construct. Said another way, the ball element (6) and the tuner (2) can be integrally formed, meaning connected together so as to make up a single complete piece or unit, or so as to work together as a single complete piece or unit, and so as to be incapable of being easily dismantled without destroying the integrity of the piece or unit.

Again referring primarily to FIG. 2 through FIG. 8, as to particular embodiments, a rod (12), whether solid or substantially hollow, can be disposed between the ball element (6) and the tuner (2), whereby the rod (12) can couple, for example fixedly couple, the ball element (6) to the tuner (2) in spaced apart relation.

As to particular embodiments, the rod (12) can taper toward one end, such as toward the end which couples to the ball element (6), thereby having a lesser cross-sectional area at this end relative to the end which couples to the tuner (2).

Now referring primarily to FIG. 9 through 25, the mounting system (1) further includes a socket element (7) having a wall (8) defining a socket (9) in communication with a wall opening (10), whereby the socket (9) is configured to pivotally receive at least a portion of the ball element (6) via the wall opening (10) to pivotally couple the ball element (6) and correspondingly, the tuner (2), to the socket element (7). Accordingly, the wall (8) can define a generally spherical socket (9) which can pivotally receive a generally spherical ball element (6).

Figure 19:
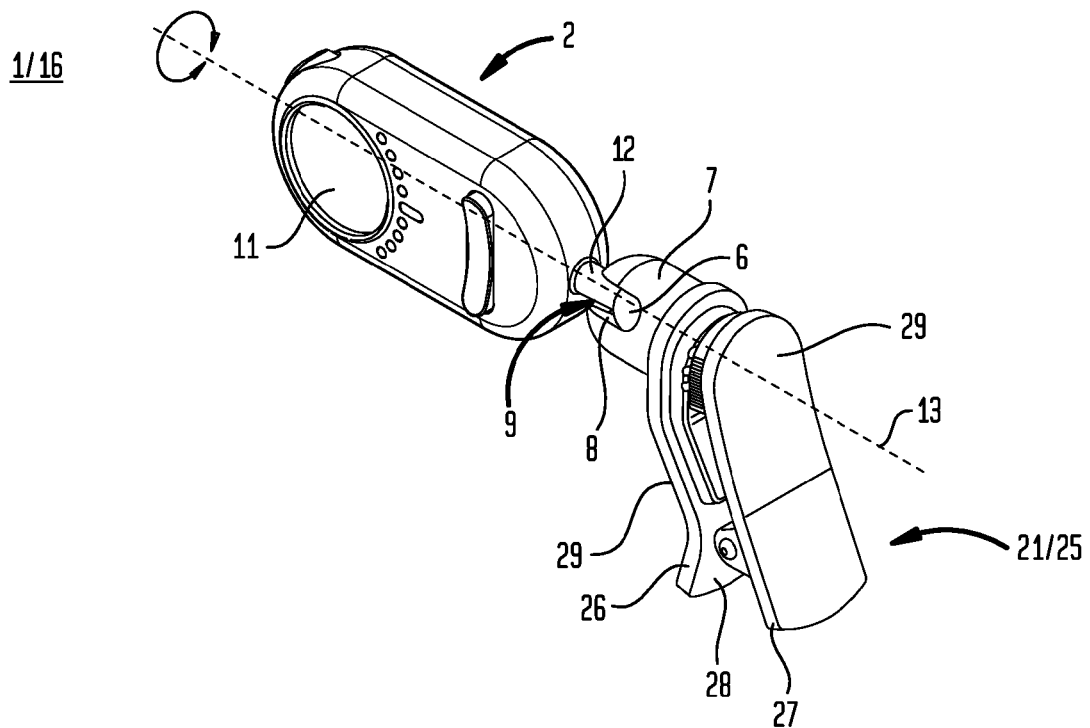
FIG. 19 is a front and right side perspective view of a particular embodiment of the mounting system comprising a tuner pivotally coupled to a mount, whereby the mount is configured as a clip.
Figure 20:
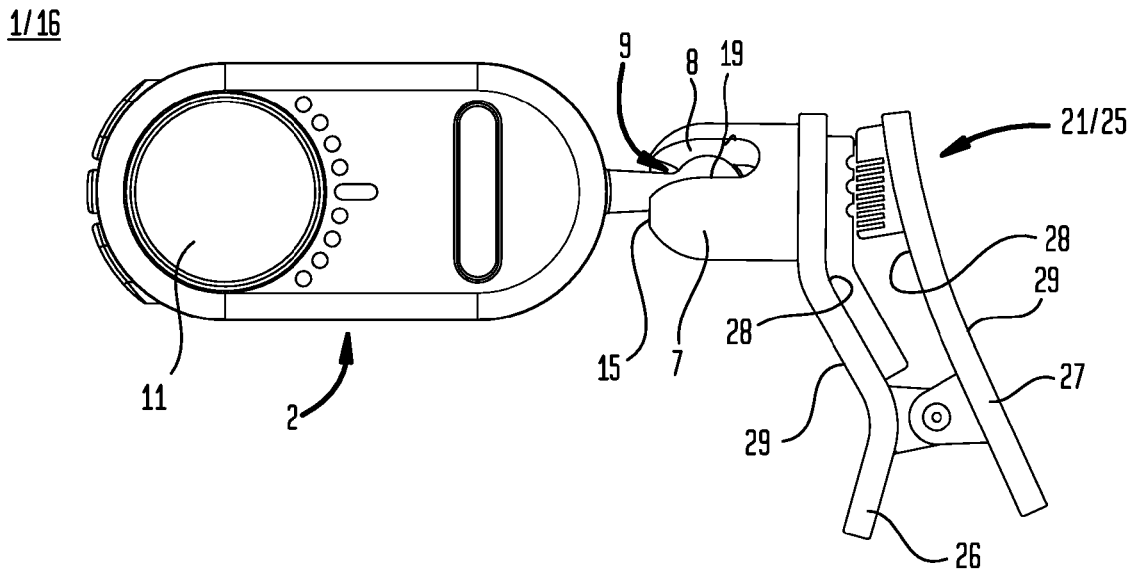
FIG. 20 is a front view of the particular embodiment of the mounting system shown in FIG. 19.
Figure 21:
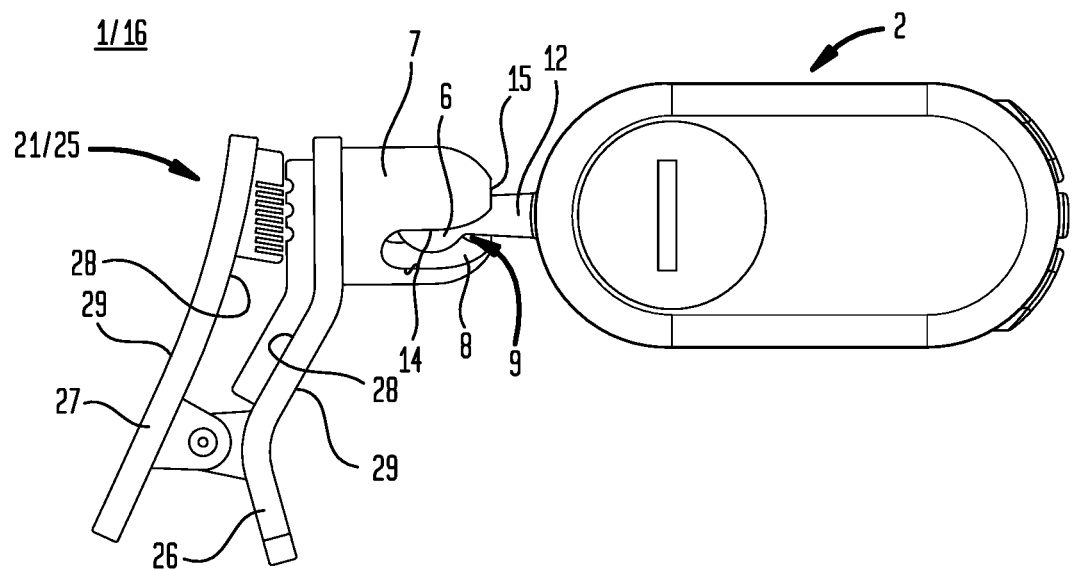
FIG. 21 is a rear view of the particular embodiment of the mounting system shown in FIG. 19.
Figure 22:
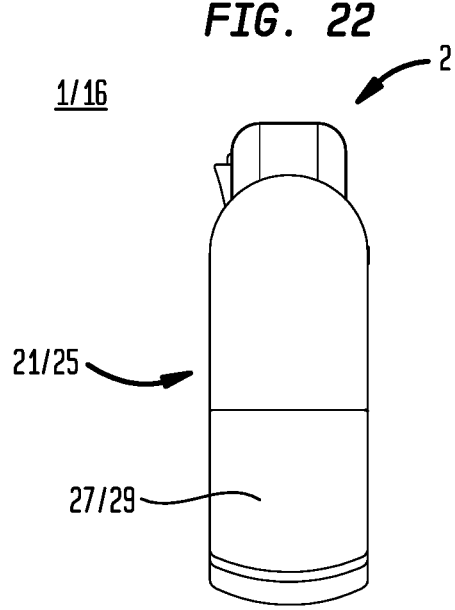
FIG. 22 is a first end view of the particular embodiment of the mounting system shown in FIG. 19.
Figure 23:
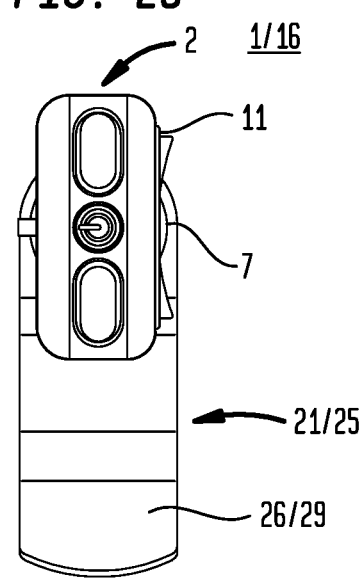
FIG. 23 is a second end view of the particular embodiment of the mounting system shown in FIG. 19.
Figure 24:
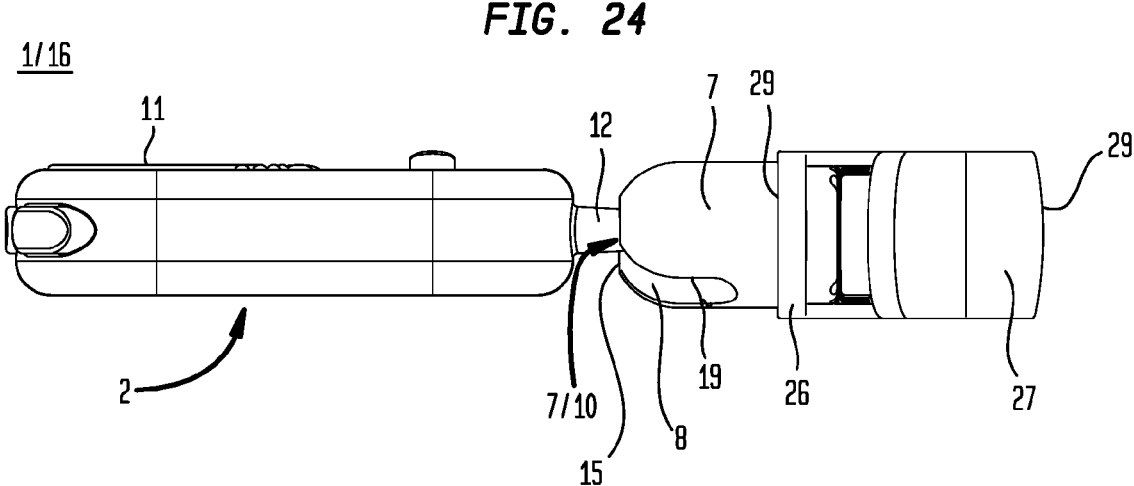
FIG. 24 is a first side view of the particular embodiment of the mounting system shown in FIG. 19.
Figure 25:
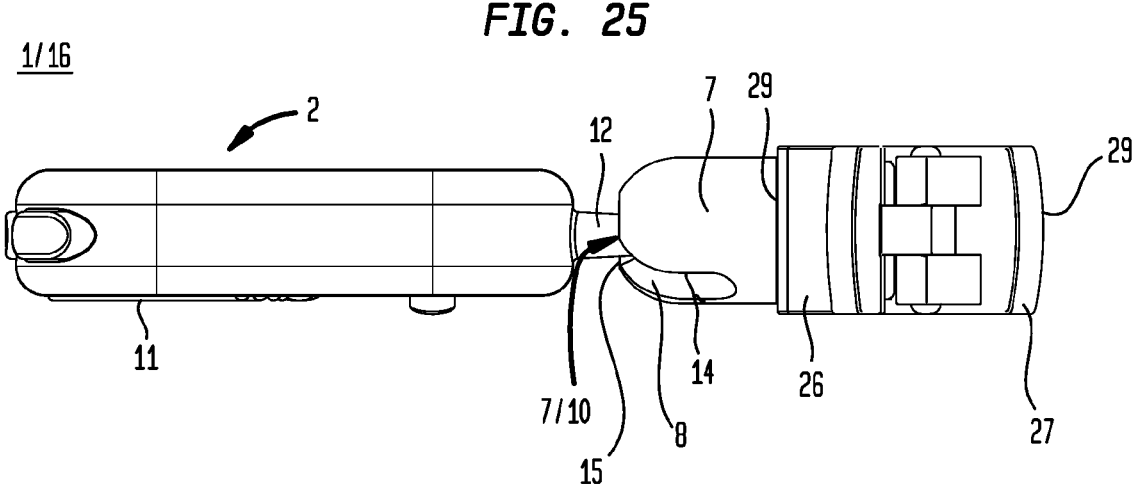
FIG. 25 is a second side view of the particular embodiment of the mounting system shown in FIG. 19.

After passing through the wall opening (10) to dispose the ball element (6) within the socket (9) and the rod (12) through the wall opening (10), the ball element (6) and correspondingly, the tuner (2), can rotate about a rotation axis (13) which runs through a medial portion of the ball element (6) as well as through the tuner (2) (as shown in FIG. 9 and FIG. 19), whereby as to particular embodiments, the ball element (6) and the tuner (2) can rotate about 360° about the rotation axis (13), which may allow viewing of the display screen (11) from any angle about the rotation axis (13).

Figure 11:
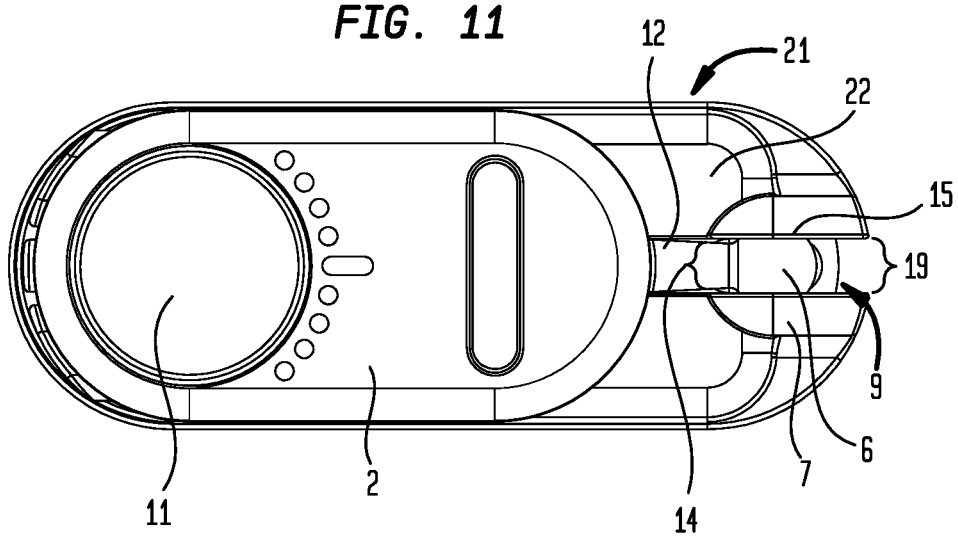
FIG. 11 is a front view of the particular embodiment of the mounting system shown in FIG. 10, whereby the tuner disposes in a first end position.
Figure 17:
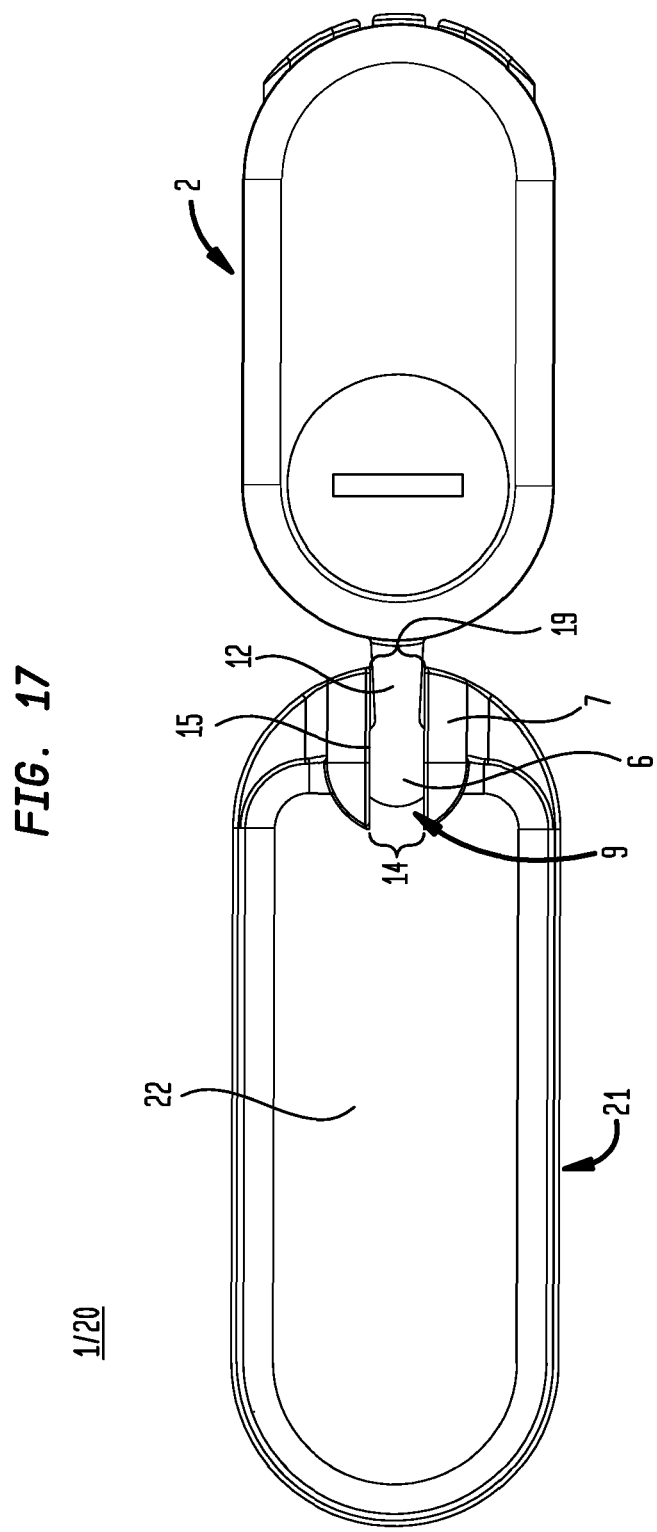
FIG. 17 is a front view of a particular embodiment of the mounting system comprising a tuner pivotally coupled to a mount, whereby the tuner disposes in a second end position.

Now referring primarily to FIG. 11 and FIG. 17, as to particular embodiments, the socket element (7) can, but need not necessarily, further include a first slot (14) disposed within the wall (8), whereby the first slot (14) communicates with the socket (9) and the wall opening (10). As an illustrative example, if the wall opening (10) disposes proximate a top portion (15) of the socket element (7), the first slot (14) can dispose proximate a first side portion (or lateral portion) of the socket element (7).

Figure 18:
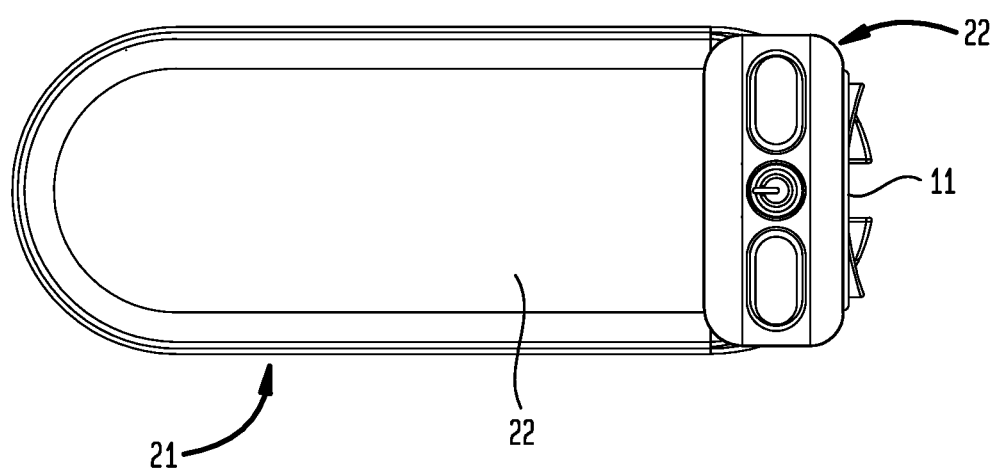
FIG. 18 is a front view of a particular embodiment of the mounting system comprising a tuner pivotally coupled to a mount, whereby the tuner disposes in a medial position.

The first slot (14) can provide a first pass-through for the rod (12), thereby allowing the ball element (6) and correspondingly, the tuner (2) to pivot between a medial position (16) and a first end position (17) in a pivot plane (18) defined by the first slot (14). In the medial position (16), the rod (12) passes through the wall opening (10) (as shown in the example of FIG. 18) and in the first end position (17), the rod (12) passes through a first slot end portion which is distal from the wall opening (10) (as shown in the example of FIG. 11). In this way, the tuner (2) can pivot about 90° between the medial and first end positions (16)(17).

Now referring primarily to FIG. 11 and FIG. 17, as to particular embodiments, the socket element (7) can, but need not necessarily, further include a second slot (19) disposed within the wall (8) opposite the first slot (14), whereby the second slot (19) also communicates with the socket (9) and the wall opening (10). As an illustrative example, if the wall opening (10) disposes proximate a top portion (15) of the socket element (7), the second slot (19) can dispose proximate a second side portion (or lateral portion) of the socket element (7).

The second slot (19) can provide a second pass-through for the rod (12), thereby allowing the ball element (6) and correspondingly, the tuner (2) to pivot between a medial position (16) and a second end position (20) in a pivot plane (18) defined by the second slot (19). In the medial position (16), the rod (12) passes through the wall opening (10) (as shown in the example of FIG. 18) and in the second end position (20), the rod (12) passes through a second slot end portion which is distal from the wall opening (10) (as shown in the example of FIG. 17). In this way, the tuner (2) can pivot about 90° between the medial and second end positions (16)(20).

Thus, as to particular embodiments of the mounting system (1) including opposing first and second slots (14)(19) disposed within the wall (8), the ball element (6) and correspondingly, the tuner (2), can pivot about 180° in the pivot plane (18) between the first and second end positions (17)(20).

Following, the tuner (2) can be disposed in any desired position (i) about the rotation axis (13) and (ii) in the pivot plane (18) to allow a user to use the tuner (2) to tune the instrument (3), whereby frictional engagement between the ball element (6) and the wall (8) defining the socket (9) can serve to maintain the desired position.

As to particular embodiments, the wall opening (10) can be configured to extend beyond a perimeter of the rod (12) when the ball element (6) disposes within the socket (9) and the rod (12) passes through the wall opening (10) or disposes in the medial position (16). Accordingly, the ball element (6) and correspondingly, the tuner (2), can pivot in additional directions until movement of the rod (12) is limited by the portion of the wall (8) defining the wall opening (10).

Now referring primarily to FIG. 9 through FIG. 25, the socket element (7) can be coupled, directly coupled, or connected to a mount (21), which may facilitate mounting of the socket element (7), as well as the mounting system (1), on an instrument (3).

As to particular embodiments, the socket element (7) can be integrated with the mount (21) such that the socket element (7) and the mount (21) are formed as a one-piece construct. Said another way, the socket element (7) and the mount (21) can be integrally formed, meaning connected together so as to make up a single complete piece or unit, or so as to work together as a single complete piece or unit, and so as to be incapable of being easily dismantled without destroying the integrity of the piece or unit.

Figure 12:
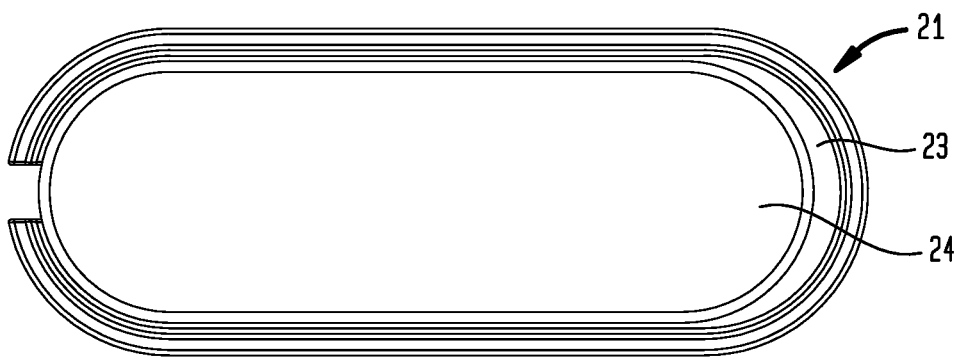
FIG. 12 is a rear view of the particular embodiment of the mounting system shown in FIG. 10.
Figure 13:
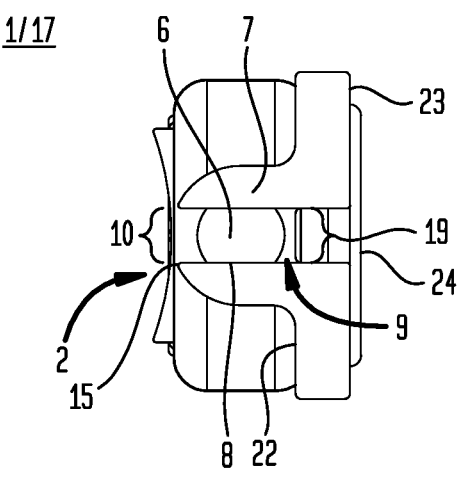
FIG. 13 is a first end view of the particular embodiment of the mounting system shown in FIG. 10.
Figure 14:
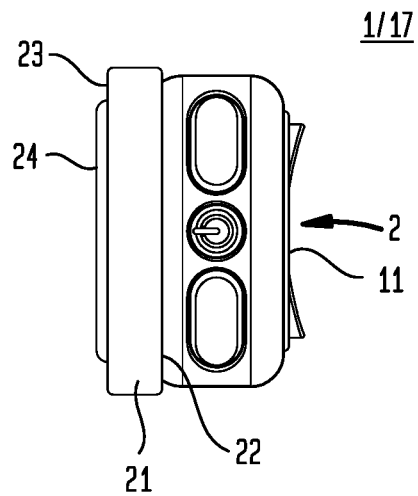
FIG. 14 is a second end view of the particular embodiment of the mounting system shown in FIG. 10.
Figure 15:
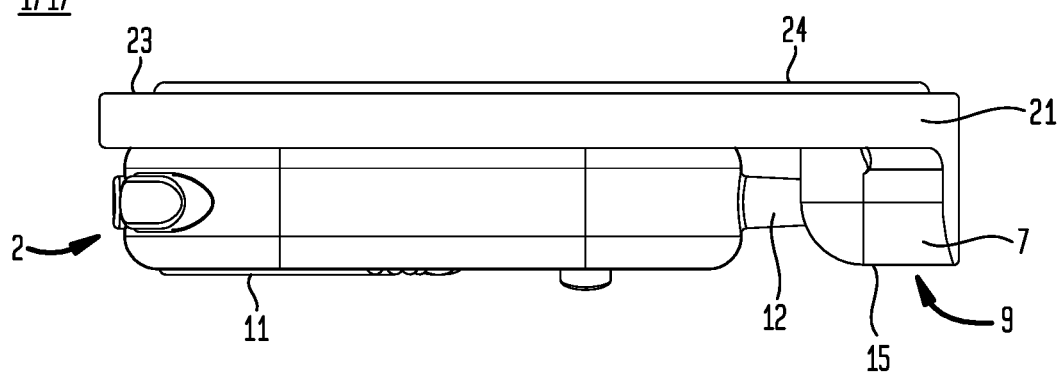
FIG. 15 is a first side view of the particular embodiment of the mounting system shown in FIG. 10.
Figure 16:
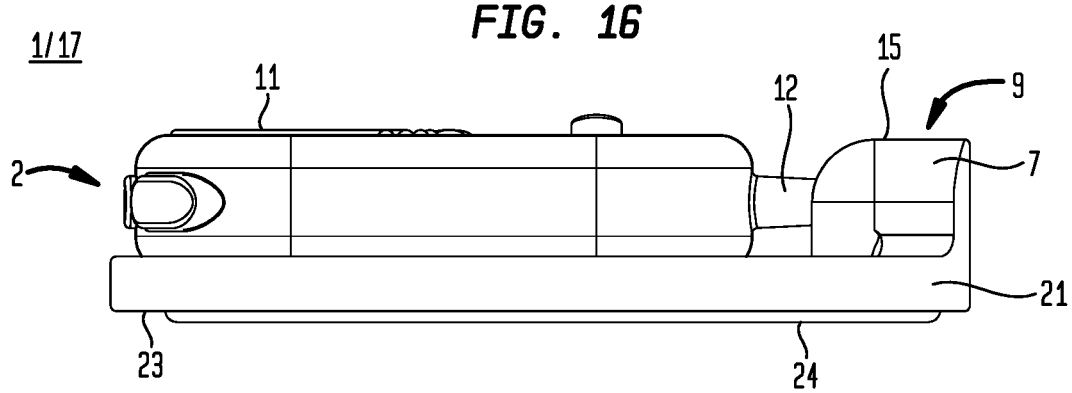
FIG. 16 is a second end view of the particular embodiment of the mounting system shown in FIG. 10.

Now referring primarily to FIG. 11 and FIG. 12, the mount (21) can have opposing front and back faces (22)(23), whereby the socket element (7) can couple to the front face (22) and the back face (23) can be configured for coupling to an instrument (3).

As to particular embodiments, the back face (23) can be configured to removably couple, removably directly couple, or removably connect to the instrument (3) such that upon removal of the mount (21), there is no damage to the instrument (3).

Now referring primarily to FIG. 12 through FIG. 16, as a first illustrative example, a removable adhesive layer (24) can be coupled to the back face (23) of the mount (21) to facilitate removable coupling of the mount (21) to an instrument (3).

As a second illustrative example, a clip (25) can be coupled to the back face (23) of the mount (21) to facilitate removable coupling of the mount (21) to an instrument (3).

Now referring primarily to FIG. 19 through FIG. 25, as to particular embodiments, the mount (21) itself can be configured as a clip (25) having pivotally connected opposing first and second jaws (26)(27) which can pivot together to clamp an object between the inner surfaces (28) of the first and second jaws (26)(27). Correspondingly, the socket element (7) can be coupled to or integrated with an outer surface (29) of one of the first and second jaws (26)(27) to provide the mount (21).

As to particular embodiments, the mount (21) can, but need not necessarily, further include a cushioning element coupled to the inner surface (28) of each of the first and second jaws (26)(27).

As to particular embodiments, the tuner (2) and the ball element (6) can be provided with a plurality of mounts (21) having varying configurations, for example with one each of the mount (21) shown in FIG. 9 through FIG. 18 and the mount (21) shown in FIG. 19 through FIG. 25, whereby the tuner (2) and the ball element (6) can be interchangeable between the plurality of mounts (21).

As to particular embodiments, the socket element (7) can be integrated with an instrument (3), such as a guitar (5) or specifically, the headstock (4) of a guitar (5), whereby the socket element (7) and the headstock (4) are formed as a one-piece construct. Said another way, the socket element (7) and the headstock (4) can be integrally formed, meaning connected together so as to make up a single complete piece or unit, or so as to work together as a single complete piece or unit, and so as to be incapable of being easily dismantled without destroying the integrity of the piece or unit.

Now regarding production, a method of making a particular embodiment of the mounting system (1) for pivotal coupling to an instrument (3) includes providing a tuner (2); outwardly extending a ball element (6) from the tuner (2); and providing a socket element (7) having a wall (8) defining a socket (9) in communication with a wall opening (10); whereby the socket (9) is configured to pivotally receive at least a portion of the ball element (6) via the wall opening (10) to pivotally couple the ball element (6) to the socket element (7).

The method of making the mounting system (1) can further include providing additional components of the mounting system (1) as described above and as described in the claims.

The mounting system (1) or elements of the mounting system (1) can be made from any of a numerous and wide variety of materials, depending upon the application. As non-limiting examples, the material can include plastic, plastic-like material, rubber, rubber-like material, injection-moldable material, or the like, or combinations thereof.

The mounting system (1) or elements of the acoustic amplification system (1) can be made by any of a numerous and wide variety of processes, depending upon the application. As non-limiting examples, the process can include press molding, injection molding, fabrication, machining, printing, additive printing, or the like, or combinations thereof.

As can be easily understood from the foregoing, the basic concepts of the present invention may be embodied in a variety of ways. The invention involves numerous and varied embodiments of a mounting system and methods for making and using such a mount system, including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "mount" should be understood to encompass disclosure of the act of "mounting"—whether explicitly discussed or not—and, conversely, were there effectively disclosure of the act of "mounting", such a disclosure should be understood to encompass disclosure of a "mount" and even a "means for mounting." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the mounting systems herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. A mounting system for pivotal coupling of a tuner to an instrument, comprising:
   said tuner;
   a ball element outwardly extending from said tuner along a longitudinal axis of said tuner;
   a rod which couples said ball element to said tuner in spaced apart relation;
   a socket element and a mount formed as a one-piece construct;
   wherein said mount comprises opposing front and back faces;
   wherein said socket element outwardly extends from said front face of said mount;
   a socket defined by said socket element;
   a first slot disposed in said socket element to provide a pivot plane along a longitudinal axis of said mount, said first slot communicating with said socket;
   wherein upon reception of said ball element within said socket, said tuner is able to pivot to a first end position in which said rod passes through said first slot to allow said tuner to overlay said front face of said mount.

2. The mounting system of claim 1, wherein said ball element has a generally spherical shape.

3. The mounting system of claim 2, wherein said wall defines a generally spherical socket.

4. The mounting system of claim 1, wherein said ball element and said tuner are formed as a one-piece construct.

5. The mounting system of claim 1, wherein upon receipt of said ball element within said socket, said tuner is able to rotate about 360° about a rotation axis which runs through said ball element and said tuner.

6. The mounting system of claim 1, wherein upon receipt of said ball element within said socket, said tuner is able to pivot about 90° between a medial position, in which said rod passes through a wall opening proximate a top portion of said socket element, and a said first end position, in which said rod passes through said first slot.

7. The mounting system of claim 6, further comprising a second slot disposed in said socket element, said second slot communicating with said socket.

8. The mounting system of claim 7, wherein upon receipt of said ball element within said socket, said tuner is able to pivot about 90° between said medial position and a second end position, in which said rod passes through said second slot.

9. The mounting system of claim 8, wherein upon receipt of said ball element within said socket, said tuner is able to pivot about 180° between said first end position and said second end position.

10. The mounting system of claim 1,
    wherein said back face of said mount is configured to couple to said instrument.

11. The mounting system of claim 10, wherein said back face of said mount is configured to removably couple to said instrument.

12. The mounting system of claim 11, further comprising a removable adhesive layer coupled to said back face of said mount.

13. The mounting system of claim 11, further comprising a clip coupled to said back face of said mount.

14. The mounting system of claim 1, wherein said mount is configured as a clip having pivotally connected opposing first and second jaws.

15. The mounting system of claim 14, wherein said mount further comprises a cushioning element coupled to an inner surface of each of said first and second jaws.

16. The mounting system of claim 1, wherein said socket element is integrated with said instrument.

* * * * *